(12) United States Patent
Culley et al.

(10) Patent No.: US 9,470,448 B2
(45) Date of Patent: Oct. 18, 2016

(54) APPARATUS TO WARM PLASTIC SIDE OF MOLD

(71) Applicant: Whirlpool Corporation, Benton Harbor, MI (US)

(72) Inventors: Brian K. Culley, Evansville, IN (US); Lindsey Ann Wohlgamuth, St. Joseph, MI (US)

(73) Assignee: Whirlpool Corporation, Bentor Harbor, MI (US)

( * ) Notice: Subject to any disclaimer, the term of this patent is extended or adjusted under 35 U.S.C. 154(b) by 764 days.

(21) Appl. No.: 13/713,176

(22) Filed: Dec. 13, 2012

(65) Prior Publication Data

US 2014/0167321 A1    Jun. 19, 2014

(51) Int. Cl.

| | | |
|---|---|---|
| F25C 1/22 | (2006.01) | |
| F25C 5/10 | (2006.01) | |
| B29C 35/04 | (2006.01) | |
| F25C 5/14 | (2006.01) | |
| B29C 31/04 | (2006.01) | |
| F25C 3/00 | (2006.01) | |
| F25C 1/08 | (2006.01) | |
| B29C 33/04 | (2006.01) | |

(Continued)

(52) U.S. Cl.
CPC . *F25C 1/22* (2013.01); *F25C 5/10* (2013.01); *B29C 31/04* (2013.01); *B29C 33/04* (2013.01); *B29C 35/041* (2013.01); *F25C 1/08* (2013.01); *F25C 1/18* (2013.01); *F25C 1/225* (2013.01); *F25C 3/00* (2013.01); *F25C 5/14* (2013.01); *F25C 5/16* (2013.01)

(58) Field of Classification Search
CPC ... B29C 31/04; B29C 33/046; B29C 33/048; B29C 33/04; B29C 33/20; B29C 33/3828; B29C 35/002; B29C 35/007; B29C 35/041; B29C 35/045; B29C 35/049; B29C 35/116; F25C 1/10; F25C 1/22; F25C 1/18; F25C 3/00; F25C 5/14; F25C 2300/00; F25C 1/08; F25C 1/00; F25C 1/225; F25C 5/16; F25C 5/00; F25C 2301/00; F25C 2400/00
See application file for complete search history.

(56) References Cited

U.S. PATENT DOCUMENTS

| | | | |
|---|---|---|---|
| 3,009,336 A | | 11/1961 | Bayston et al. |
| 4,562,991 A | * | 1/1986 | Wu .................. A23G 9/083 249/117 |
| 4,587,810 A | * | 5/1986 | Fletcher ............ F25B 21/02 249/130 |

(Continued)

FOREIGN PATENT DOCUMENTS

| | | |
|---|---|---|
| JP | 1196478 A | 8/1989 |
| JP | 1210778 A | 8/1989 |

(Continued)

*Primary Examiner* — Linda L Gray

(57) ABSTRACT

An ice producing mold has a first mold portion having a top surface and a second mold portion having a bottom surface. When the mold is in a closed position, a bottom surface of the first mold portion abuts a top surface of the second mold portion and when the mold is in an open position, the bottom surface of the first mold portion is separated from the top surface of the second mold portion. Each mold portion also includes a concave depression such that when the mold is in the closed position, the concave depression on the bottom surface of the first mold portion and the concave depression on the top surface of the second mold portion form a cavity adapted to form an ice structure. The depression is warmed by flowing warm water into a cavity located adjacent to the concave depression and the ice is released.

13 Claims, 2 Drawing Sheets

(51) Int. Cl.
*F25C 5/16* (2006.01)
*F25C 1/18* (2006.01)

(56) References Cited

U.S. PATENT DOCUMENTS

| | | | | |
|---|---|---|---|---|
| 4,627,946 | A | * | 12/1986 | Crabtree ............... B29C 67/222 264/335 |
| 4,669,271 | A | * | 6/1987 | Noel ..................... A23G 3/28 249/117 |
| 4,910,974 | A | | 3/1990 | Hara |
| 4,971,737 | A | * | 11/1990 | Infanti ................... A23L 3/364 249/55 |
| 5,372,492 | A | * | 12/1994 | Yamauchi ................. F25C 5/14 249/79 |
| 5,632,936 | A | * | 5/1997 | Su ....................... B29C 35/0888 264/1.38 |
| 5,970,735 | A | | 10/1999 | Hobelsberger |
| 6,857,277 | B2 | | 2/2005 | Somura |
| 2004/0206250 | A1 | | 10/2004 | Kondou et al. |

FOREIGN PATENT DOCUMENTS

| | | |
|---|---|---|
| JP | 2004185 A | 1/1990 |
| JP | 2143070 A | 6/1990 |
| JP | 2003336947 A | 11/2003 |
| JP | 2005180825 A | 7/2005 |
| WO | WO8808946 A1 * 11/1988 ............. A23G 9/083 |

\* cited by examiner

APPARATUS TO WARM PLASTIC SIDE OF MOLD

CROSS-REFERENCE TO RELATED APPLICATIONS

The present application is related to, and hereby incorporates by reference, the entire disclosures of the following applications for United States Patents: U.S. patent application Ser. No. 13/713,126 entitled "CLEAR ICE SPHERES," filed on even date herewith; U.S. patent application Ser. No. 13/712,131 entitled "MOLDED CLEAR ICE SPHERES," filed on even date herewith; U.S. patent application Ser. No. 13/713,119 entitled "CLEAR ICE HYBRID MOLD," filed on even date herewith; and U.S. patent application Ser. No. 13/713,140 entitled "MOLDED CLEAR ICE SPHERES," filed on even date herewith.

FIELD OF THE INVENTION

The present invention generally relates to an ice mold apparatus for making substantially clear ice pieces, and methods of using the same.

SUMMARY OF THE INVENTION

One aspect of the present invention includes an ice producing mold apparatus which has a first mold portion having a top surface and at least one perimeter sidewall extending downwardly therefrom and a second mold portion having a bottom surface and at least one perimeter sidewall extending upwardly therefrom. The first mold portion is operably coupled to the second mold portion such that the mold apparatus is operable between an open position and a closed position. In the open position, a bottom surface of the first mold portion is spaced apart from a top surface of the second mold portion. In the closed position, the bottom surface of the first mold portion abuts the top surface of the second mold portion. The first mold portion also includes a concave depression disposed on its bottom surface. A reciprocal concave depression is disposed on the top surface of the second mold portion. The concave depression of the first mold portion and the reciprocal concave depression of the second mold portion engage each other when the mold apparatus is in the closed position to define a mold cavity adapted to form one or more ice structures therein. The mold apparatus further includes an inlet disposed on the first mold portion. The inlet is adapted to provide liquid ingress into the mold cavity. A liquid circulating manifold is disposed within the first mold portion and is in fluid communication with an inlet. The liquid circulating manifold is adapted to circulate liquid within a body portion of the first mold portion to create a thermal conductivity level of the first mold portion that is lower than a thermal conductivity level associated with the second mold portion. The liquid circulating manifold is further adapted to receive a warm liquid medium to heat the first mold portion to help release the one or more ice structures from the mold apparatus in the open position.

Another aspect of the present invention includes a method of releasing ice structures from a mold apparatus. First, a mold apparatus is provided having a first mold portion including a concave depression and a liquid circulating manifold. The mold apparatus further includes a second mold portion having a reciprocal concave depression. The first mold portion is pivotally coupled to the second mold portion such that the mold apparatus is operable between an ice forming position and an ice harvesting position. In this method, the first mold portion comprises a lower thermal conductivity relative to a thermal conductivity of the second mold portion. The mold apparatus is assembled to the ice forming position wherein the first mold portion and the second mold portion are abuttingly engaged such that the concave depressions of the first mold portion and the second mold portion align to create a mold cavity. Water is then injected into the mold cavity and the mold apparatus is cooled to form at least one ice structure within the mold cavity. A warm liquid medium is circulated into the liquid circulating manifold to warm the mold apparatus. Finally, the mold apparatus is disassembled into the ice harvesting position and the ice structure is released from the mold apparatus.

These and other features, advantages, and objects of the present invention will be further understood and appreciated by those skilled in the art by reference to the following specification, claims, and appended drawings.

DETAILED DESCRIPTION

For purposes of description herein, the aspects of this disclosure may assume various alternative orientations, except where expressly specified to the contrary. The specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
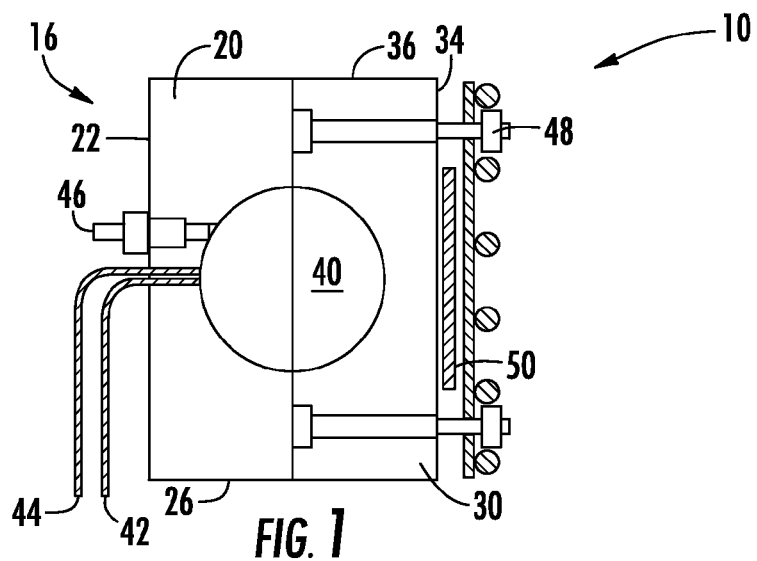
FIG. 1 is a side elevational view of an ice-producing mold in a closed position.

FIG. 1 generally illustrates an ice-producing mold 10 which includes a first mold portion 20 and a second mold portion 30. The first mold portion 20 is generally rectangular in shape and includes a top surface 22. The top surface 22 typically has at least one perimeter side wall 26, more commonly two perimeter side walls 26, which extend downwardly from the top surface 22. The first mold portion 20 of the mold 10 also has a bottom surface 24 which includes a concave depression 28. This depression 28 is typically formed in a semi-spherical shape and is centrally arranged on the bottom surface 24.

The mold 10 further includes has a second portion 30 which is operably coupled to the first mold portion 20. The second mold portion 30 includes a top surface 32 which has at least one, and preferably two, perimeter side walls 36 extending upwardly therefrom. Along with a bottom surface 34, the top surface 32 and perimeter side walls 36 form a generally rectangular shape of the second mold portion 30 as shown in FIG. 1. The top surface 32 of the second mold portion also includes a concave depression 38 which is typically semi-spherically shaped and reciprocal of the concave depression 28 of the first mold portion 20. The second mold portion 30 also includes a plurality of apertures which receive mounting fasteners 48 in order to mount the second mold portion 30 in an appliance, such as a freezer. The bottom surface 34 of the second mold portion is adapted to be in thermal communication with a cooling mechanism 50, typically an evaporator, in order to cool the mold 10.

Figure 2:
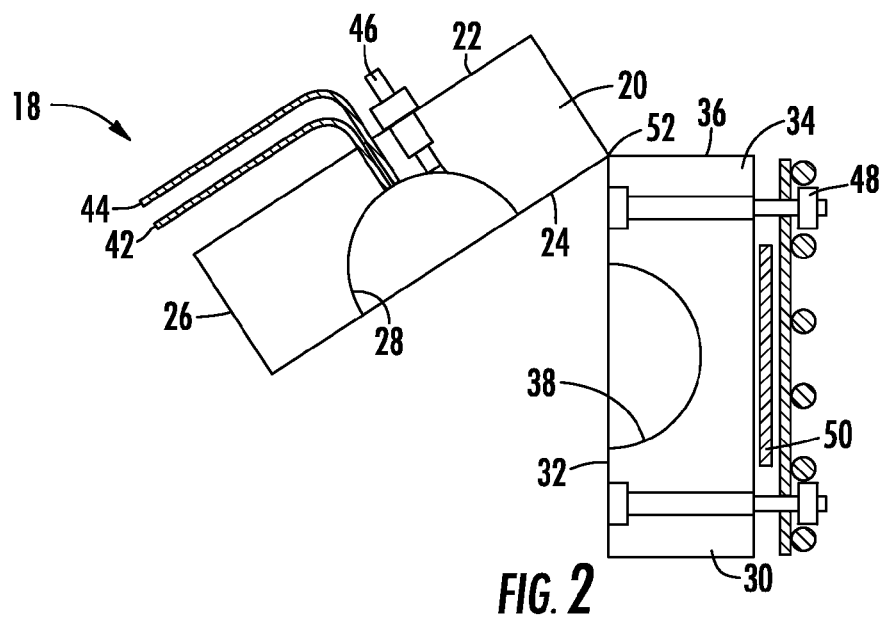
FIG. 2 is a side elevational view of the ice-producing mold of FIG. 1 in an open position.
Figure 3:
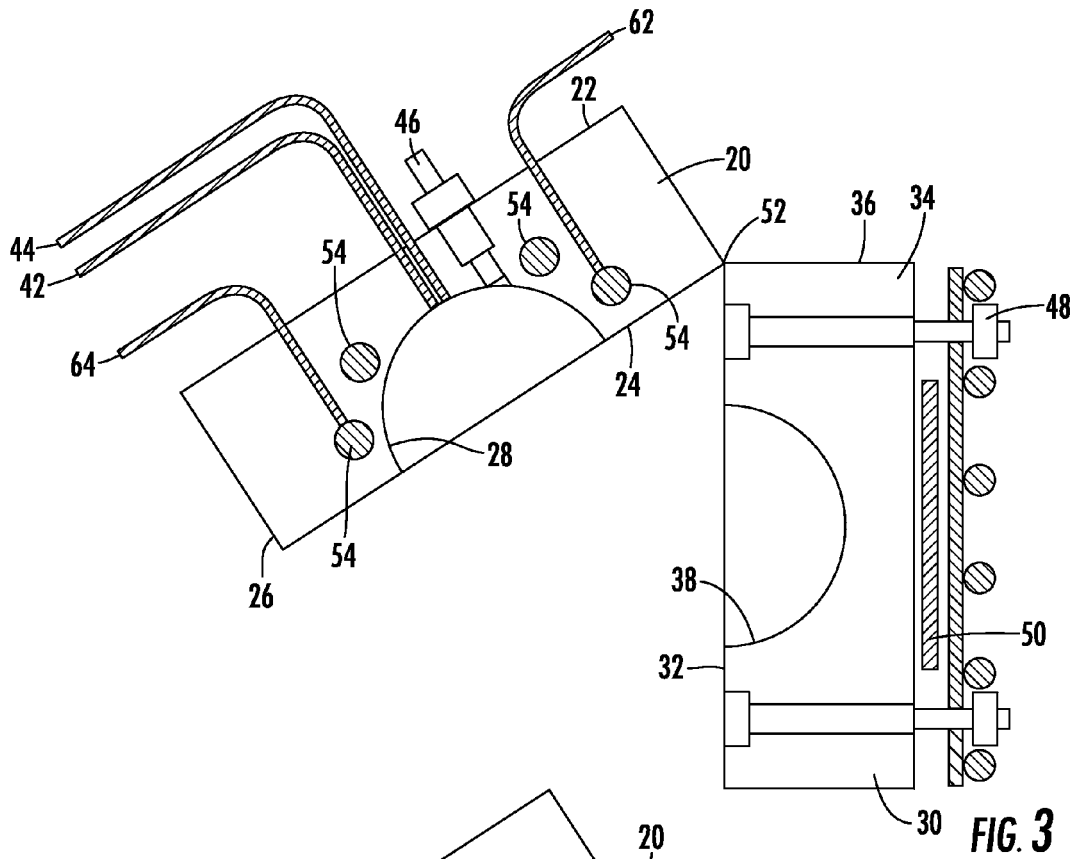
FIG. 3 is a side elevational view of another embodiment of an ice-producing mold in an open position.
Figure 4:
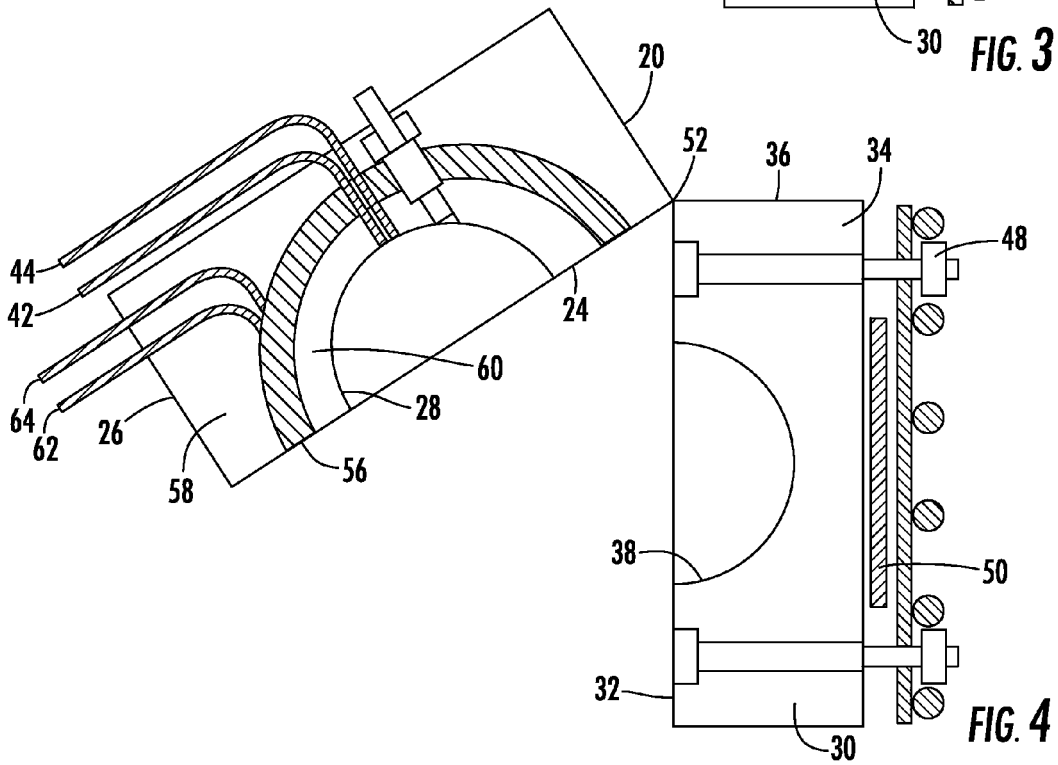
FIG. 4 is a side elevational view of another embodiment of an ice-producing mold in an open position.

The mold 10 is operable between a closed position 16, shown in FIG. 1, and an open position 18, shown in FIG. 2 as the first and second mold portions 20, 30 are generally operably coupled by a hinge member 52 (FIGS. 3 and 4). When the mold 10 is in the closed position 16, the bottom surface 24 of the first mold portion 20 abuts the top surface 32 of the second mold portion 30. Also, while in the closed position 16, at least one perimeter sidewall 26 of the first mold portion 20 and at least one perimeter sidewall 36 of the second mold portion 30 form a flat planar surface. In the closed position 16, the first mold portion 20 and the second mold portion 30, form a single rectangular mold 10. The mold 10 may also be of any other shape, including but not limited to spherical, cylindrical, cubical, or any other shape one with ordinary skill in the art would use to create specially shaped ice structures. While in the closed position 16, the concave depression 28 of the first mold portion 20 and the concave depression 38 of the second mold portion 30 are aligned and cooperate to define a mold cavity 40 which is adapted to form one or more ice structures therein. As shown in FIGS. 1-4, the mold cavity 40 is spherical in shape but may be star-shaped, heart-shaped, rectangular-shaped, triangular-shaped, or any other shape a user would desire.

Referring now to FIG. 2, when the mold 10 is in an open position 18, the bottom surface 24 of the first mold portion 20 is separated or spaced apart from the top surface 22 of the second mold portion 30. As noted above, the first mold portion 20 and the second mold portion 30 may be operably coupled in a pivotal manner by a hinge member 52. Typically, one perimeter side wall 26 of the first mold portion 20 is connected with one perimeter side wall 36 of the second mold portion 30. It is further contemplated that the first mold portion 20 and the second mold portion 30 may be separate pieces that are moveably associated with one another.

Referring now to FIG. 3, the first mold portion 20 may also include one or more liquid circulating manifolds 54. These manifolds 54 are integrally formed in a body portion of the first mold portion 20 and are in fluid communication with at least one manifold inlet 62 and at least one manifold outlet 64. The manifold inlet 62 is adapted to provide liquid ingress into the at least one manifold 54 of the first mold portion 20 in order to warm the mold 10. The liquid circulating manifolds 54 are arranged adjacent to the concave depression 28 on the first mold portion 20. The manifolds 54 may have a variety of shapes including cylindrical, triangular, or any other shape that would allow for sufficient warming of the first mold portion 20. The manifolds 54 may be of any arrangement which allows bonds formed between an ice structure and the mold 10 to be broken in order to facilitate harvesting of the ice structure from the mold 10 including a plurality or liquid circulating structures 54 disposed adjacent to the concave depression of the first mold portion 20 as shown in FIG. 3. The manifold may also be a single manifold jacket 56 which is disposed adjacent to and generally follows the contours of the concave depression 28 of the first mold portion 20 as shown in FIG. 4. When the manifold 54 is a single manifold jacket 56, the first mold portion 20 may be comprised of a two-piece system having an upper mold portion 58 and a cavity side portion 60. The upper mold portion 58 of the first mold portion 20 includes the top surface 22 of the first mold portion 20 along with the perimeter side walls 26. The cavity side portion 60 of the first mold portion 20 includes the mold segment disposed between the manifold water jacket 56 and the concave depression 28. The liquid circulating manifold 54 is further adapted to receive a warm liquid medium in order to heat the first mold portion 20 and to release the at least one ice structure from the first portion 20 of the mold 10 while the mold 10 is in the open position 18.

As shown in FIGS. 1-4, the top surface 22 of the first mold portion 20 includes one or more apertures configured to receive an inlet 42 and an outlet 44. The inlet 42 is generally configured to allow liquid to pass through the top surface 22 of the mold 10 and down into the concave depression 28 of the first mold portion 20. The inlet 42 is typically coupled to an appliance or other liquid supplying device. Any excess liquid not frozen during the ice forming process is typically dispelled through the outlet 44, thereby providing continuous water movement or circulation within the mold cavity 40 during an ice formation process.

When forming an ice structure, the mold 10 generally begins in the ice forming, or closed position 16. Water is injected through the inlet 42 of the first mold portion 20 and into the mold cavity 40 and fills the mold cavity 40. Excess water is typically removed through the outlet 44 by water pressure, but water could also be removed from the mold cavity 40 by any known technique as one with ordinary skill in the art would use to remove excess water. The mold 10 is then cooled by using the evaporator 50 located in thermal communication with the bottom surface 34 of the second mold portion 30, but could be cooled by any other known technology such as thermoelectric cooling or cold air circulation. The first mold portion 20 and the second mold portion 30 of the present invention are configured to have different thermal conductivities. The second mold portion 30 is made from a substantially metallic material while the first mold portion 20 is comprised of a substantially polymeric or thermoplastic material. This allows for optimal freezing and releasing of the ice as formed in the mold cavity 40. Having the cooling device 50 disposed adjacent to the second mold portion 30, the portion with a higher thermal conductivity, allows the cooling device 50 to be used more efficiently to cool the mold 10 quickly. Having a first mold portion 20 with a lower thermal conductivity, allows for an ice removal process that is less susceptible to dimpling or cracking and allows the first mold portion 20 to be warmed in precise locations needed to efficiently and effectively remove the ice from the mold 10.

Once the ice structure is completely formed, the mold 10 is opened to an open position 18. The mold 10 can be opened at its hinge member 52 located on the perimeter side wall of each of the first and the second mold portions 26, 36, or the first mold portion 20 may be completely separated from the second mold portion 30. The first mold portion 20, while in the open position 18, is generally angled downward, which allows the formed ice body, or ice structure, to be gravitationally removed from the first mold portion 20. This also allows the ice structure to eject or release from the first mold portion 20 into an awaiting ice storage container, without interference from the second mold portion 30. Once the mold 10 is opened, warm liquid flows into the manifold inlet 62 in order to warm the plastic first mold portion 20. This heating effect helps to break any mechanical ice bonds formed between the ice structure and the first mold portion 20. The ice structure is then released down into the storage container.

The removal of the ice structure may occur in a variety of ways. First, the warm water may flow directly into the mold cavity 40 which melts the ice structure a small amount in order to break any mechanical ice bonds formed between the ice structure and the mold 10 to release the ice structure.

This method can cause dents or other dimpling in the ice structure and is generally not preferred. Additionally, the warm water may be injected from the manifold inlet 62 into at least one manifold 54 which is disposed within a body portion of the first mold portion 20. These manifolds 54 are warmed by incoming water, or another thermal fluid, which ultimately warms the mold and breaks the bond between the ice structure and the plastic mold 20 and allows the ice structure to be released into the storage container. Moreover, the first mold portion 20 may include a manifold water jacket 56 which substantially surrounds the entire concave depression 28 of the first mold portion 20. Warm water, or another like warming medium, may be injected or otherwise released into this manifold water jacket 56 to warm the mold 10 and allow the bonds to break between the ice structure and the mold 10.

The first mold portion 20 of the mold 10 may further include an ejector pin mechanism 46 which extends from the top surface 22 of the first mold portion 20 and into the mold cavity 40. When the ice structure is ready to be removed from the mold 10, the ejector pin 46 is moved to an extended position within the mold cavity 40 and then applies a force on the formed ice structure to help release the ice structure and break the bond between the ice structure and the mold 10. The formed ice structures are then stored in a storage container where they are kept until they are dispensed or otherwise retrieved by the user.

Other variations and modifications can be made to the aforementioned structures and methods without departing from the concepts of the present disclosure. These concepts, and those mentioned earlier, are intended to be covered by the following claims unless the claims by their language expressly state otherwise.

What is claimed is:

1. An ice producing mold apparatus comprising:
a first mold portion having a top surface and at least one perimeter sidewall extending downwardly therefrom and a second mold portion having a bottom surface and at least one perimeter sidewall extending upwardly therefrom, wherein the first mold portion is operably coupled to the second mold portion such that the mold apparatus is operable between an open position wherein a bottom surface of the first mold portion is spaced apart from a top surface of the second mold portion, and a closed position wherein the bottom surface of the first mold portion abuts the top surface of the second mold portion;
a concave depression disposed on the bottom surface of the first mold portion, and a reciprocal concave depression disposed on the top surface of the second mold portion, wherein the concave depression of the first mold portion and the reciprocal concave depression of the second mold portion engage each other when the mold apparatus is in the closed position to define a mold cavity adapted to form one or more ice structures;
an inlet disposed on the first mold portion, wherein the inlet is adapted to provide liquid ingress into the mold cavity to provide the liquid being frozen into the one or more ice structures in the mold cavity;
a liquid circulating manifold water jacket disposed within the first mold portion adjacent to the concave depression of the first mold portion, and in fluid communication with a manifold inlet, wherein the liquid circulating manifold is configured to circulate liquid within a body portion of the first mold portion but not within the concave depression of the first mold portion in order to create a thermal conductivity level associated with the second mold portion;
a cooling member at the bottom of the second mold portion, the cooling member being configured to freeze the liquid in the mold cavity into the one or more ice structures; and
wherein the liquid circulating manifold is further configured to receive a warm liquid medium which is warm enough to break a bond between the first mold portion and the one or more ice structures produced in the mold cavity, and to heat the first mold portion to release the one or more ice structures from the mold apparatus in the open position.

2. The ice producing mold apparatus of claim 1, wherein the first mold portion and the second mold portion are operably coupled by a hinge member.

3. The ice producing mold apparatus of claim 1, wherein the one or more ice structures are clear ice structures.

4. The ice producing mold apparatus of claim 1, wherein the one or more ice structures are substantially spherically shaped ice structures.

5. The ice producing mold apparatus of claim 1, further comprising an ejector pin configured to eject the one or more ice structures.

6. The ice producing mold apparatus of claim 1, wherein the liquid circulating manifold water jacket separates the first mold portion into an upper mold portion and a cavity side portion.

7. The ice producing mold apparatus of claim 6, wherein the manifold water jacket is semi-circle in shape.

8. The ice producing mold apparatus of claim 1, wherein the first mold portion further includes a mold cavity outlet.

9. The ice producing mold apparatus of claim 8, wherein the liquid circulating manifold further includes a manifold outlet.

10. The ice producing mold apparatus of claim 1, wherein the second mold portion is coupled to an appliance with a plurality of fasteners.

11. The ice producing mold apparatus of claim 1, wherein the first mold portion is substantially comprised of a thermoplastic material.

12. The ice producing mold apparatus of claim 11, wherein the second mold portion is substantially comprised of a metallic material.

13. The ice producing mold apparatus of claim 12, wherein the first mold portion has a lower thermal conductivity than that of the second mold portion.

* * * * *